United States Patent [19]

Cherry

[11] 4,102,498
[45] Jul. 25, 1978

[54] RING LOCK ACTUATION SYSTEM

[75] Inventor: Charles C. Cherry, McGregor, Tex.

[73] Assignee: Hercules Incorporated, Wilmington, Del.

[21] Appl. No.: 566,018

[22] Filed: Apr. 7, 1975

[51] Int. Cl.² ............................................. B63H 11/10
[52] U.S. Cl. ................................. 239/265.19; 60/271
[58] Field of Search ..................... 239/265.15, 265.19, 239/265.29, 265.31; 60/225, 242, 250, 271

[56] References Cited

U.S. PATENT DOCUMENTS

| | | | |
|---|---|---|---|
| 3,011,309 | 12/1961 | Carter | 239/265.15 |
| 3,063,240 | 11/1962 | Ledwith | 60/225 |
| 3,182,447 | 5/1965 | Bell | 60/242 |
| 3,302,890 | 2/1967 | Silver | 239/265.31 |
| 3,914,935 | 10/1975 | Burkes, Jr. | 60/242 |

*Primary Examiner*—Samuel Feinberg

[57] ABSTRACT

A mechanical actuation system for secondary centerbody nozzle actuation commonly associated with a dual area solid rocket nozzle configuration that utilizes a rotating ring in combination with at least one piston connected to pins that are affixed to the movable centerbody. The ends of the pins adjacent the rotating ring are misaligned with holes in the rotating ring such that the ring lock prevents the centerbody from moving to a closed or blocking position until such time as the ring lock is rotated by ring actuation means to align the holes with the pins. The pins then simultaneously slide through the holes moving the centerbody to the closed position.

6 Claims, 6 Drawing Figures

RING LOCK ACTUATION SYSTEM

CROSS-REFERENCE TO RELATED APPLICATION

This application is related to abandoned application Ser. No. 863,825 under a Patent Office Secrecy Order entitled, "Self Actuated Dual Area Nozzle" assigned to the assignee of the present application.

BACKGROUND OF THE INVENTION

1. Field of the Invention

This invention relates to the field of solid rocket engine propulsion.

More particularly, this invention relates to the actuation means to manipulate a secondary centerbody of a dual area solid propellant rocket motor having boost and sustain phase operating modes.

2. Description of the Prior Art

The prior art invention cross-referenced as a related application incorporates two discrete throat areas into one nozzle body. The foregoing is accomplished by means of the formation of a conventional throat area in a nozzle. There is additionally present, a movable plug or body which moves at the occurrence of a predetermined combustion chamber pressure drop to a sealing position with the main body wherein one flow area is presented. For example, a normal nozzle throat configuration is initially preformed. A movable flow-restriction body is disposed just upstream of the throat area of the nozzle formed. The movable body has the second nozzle area formed concentrically within itself. Thus, in an open position the hot gases flow around the movable body, through the main nozzle as well as through the movable body and its secondary nozzle. In the closed position resultant from the combustion chamber having reached a predetermined pressure drop, the movable body is flush against the walls leading to the throat area of the nozzle and the gases will only flow through the center or secondary exit. The movable body is operable by at least one piston connected to the body and disposed within a cavity surrounding the normal throat. The piston defines an upper and lower chamber, both chambers of which are in communication with the combustion chamber and sensitive to pressure changes in the main combustor. A lessening of pressure on the bottom of the piston causes the piston to translate in a rearward direction which moves the body toward a blocking position. Thus it is seen that the movable body affects the flow of gases through the first nozzle area.

The present invention does not rely on chamber pressures to actuate a centerbody into a blocking position.

SUMMARY OF THE INVENTION

A mechanical ring lock actuation device to facilitate movement of a secondary nozzle body commonly associated with a dual area solid rocket nozzle configuration into a blocking position during rocket engine operation that consists of a main nozzle body, the body forming a main throat section thereby, the nozzle body terminating at a first end portion perpendicular to an axis of the nozzle body.

A movable centerbody is spaced from, concentrically positioned within and axially aligned with the main nozzle body, the centerbody forming a secondary nozzle thereby.

At least one elongated support piston rod axially aligned with and connected to one end of the downstream side of the centerbody and at its opposite end, the piston rod is interfitted with at least one cylinder formed by said nozzle body. The preferred embodiment has three equidistantly spaced support piston rods supporting the centerbody.

At least one piston rod spike connected to the opposite end of said support piston rod, the spiked rod being axially aligned and centrally positioned within said at least one cylinder, the downstream conically shaped spiked end of the piston rod spike extending through at least one orifice formed by the first end portion of the main nozzle body, the orifice being slightly larger in diameter than the diameter of the spiked piston rod, the spiked rod being slidable within the orifice.

A ring lock plate having a first side positioned adjacent the first end of the main nozzle body and rotatable thereon, the ring lock plate defining at least one chamferred orifice, the smaller opening of the chamferred orifice is defined by a second downstream side of the plate, the smaller opening being the same size as the orifice in the first end of the main nozzle body, the larger opening being defined by the first side of the ring lock plate facing the end of the main nozzle body, the angle of the chamferred orifice parallels the angle of the conically shaped end of the piston rod spike, the ring lock plate is rotated to align a portion of the orifice in the ring lock plate with the at least one orifice in the first end of the nozzle body to allow the conically shaped end of the piston rod spike to protrude into but not through the chamferred orifice, a portion of the conical surface of the spiked end contacting a portion of the parallel wall of said chamferred orifice in the ring lock plate.

A mechanical device to retain the ring lock plate in the misaligned position to prevent rotation, thus preventing translation of the centerbody from movement to a blocking position.

An apparatus is used to release the retaining means to allow the ring lock plate to rotate aligning the, at least one chamferred orifice in the plate with the orifice in the first end of the main nozzle body to allow the centerbody to translate to a blocking position.

The centerbody is supported by, for example, three pistons equidistantly spaced and interfitted with cylinders positioned into the aft body of the rocket engine housing. Downstream of the pistons and connected thereto are rods axially aligned with the pistons. The rods or pins terminate in a conically shaped point that extends into a radially disposed movable ring lock plate. The ring lock plate has a series of holes formed thereby that correspond to the number of pins connected to the pistons.

By restraining the ring lock plate to prevent rotational movement, the conically shaped pointed ends of the pins protrude into, but do not align with the holes. The side walls of the chamferred apertures formed by the ring lock plate mate with the conically shaped pointed end of each of the pins. Compressive forces set up by contacting a portion of each pin with a portion of the side wall in the ring lock plate supplies sufficient restraint to prevent translation of the pistons within their respective cylinders, thus restraining the centerbody in the open or unactuated position.

A tab on the ring lock plate and a tab affixed to the end wall of the nozzle body co-act with, for example, an exploding bolt therebetween to restrain the ring plate from rotating. When the exploding bolt is actuated, the explusion gas pressure acting on the centerbody forces the conically shaped pointed ends of the pins into alignment with their respective chamferred holes in the ring lock plate rotating the plate thereby.

Retaining shoulder type bolts inserted through slots in the ring plate and screwed into the base of the nozzle body end plate allow the ring to rotate while preventing the ring lock plate from becoming disengaged with the nozzle body upon actuation of the exploding bolt.

Therefore, it is an object of this invention to provide a mechanical means to actuate the centerbody of a dual area solid propellant rocket motor.

More specifically, it is an object of this invention to provide a rotatable ring lock plate that structurally restrains misaligned pins connected to pistons supporting the centerbody, upon actuation, rotation of the ring lock plate simultaneously releases each pin to cause the centerbody to move to the closed or blocking position.

An advantage over the prior art is the non-reliance upon internal gas pressures to actuate a centerbody.

Still another advantage over the prior art is the decrease in weight due to the lighter operational loads and simpler design of the device of the instant invention.

The above noted objects and advantages of the present invention will be more fully understood upon a study of the following detailed description in conjunction with the detailed drawings.

DESCRIPTION OF THE PREFERRED EMBODIMENTS

Figure 1:
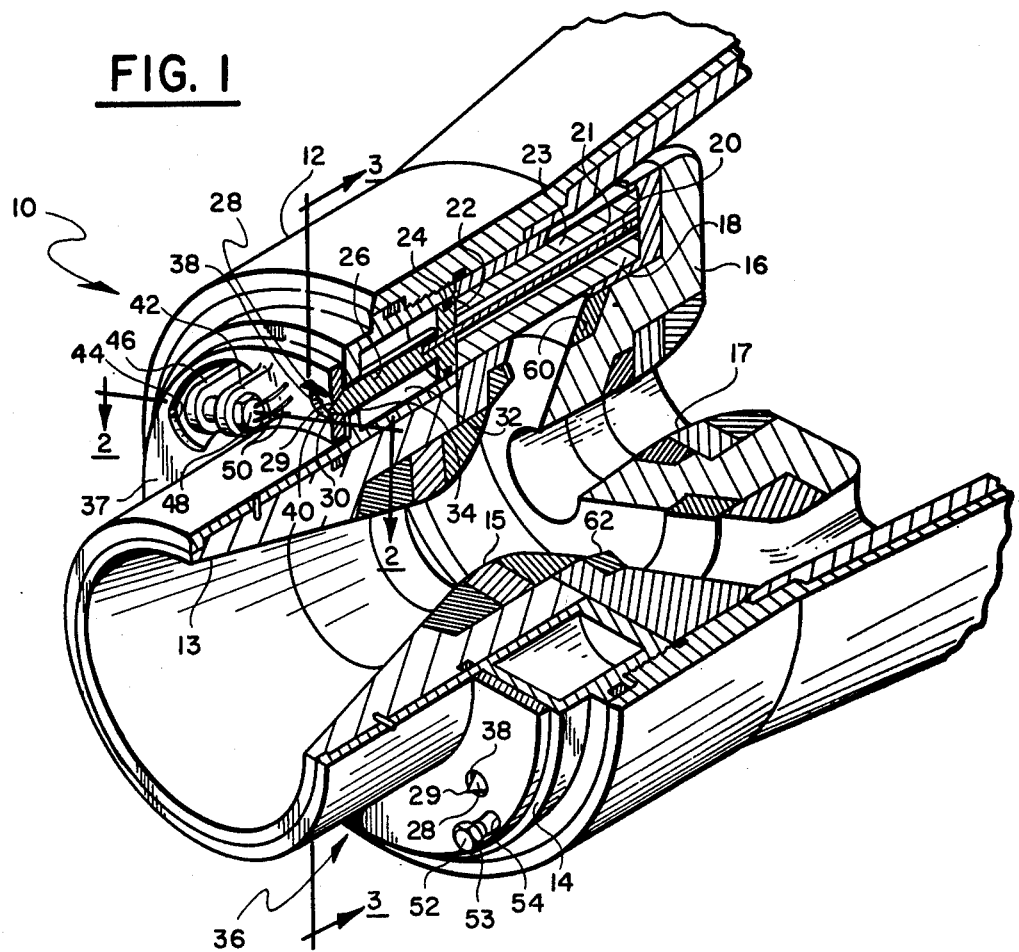
FIG. 1 is a partially cut-away perspective view of the overall apparatus of the preferred embodiment of the invention.

Turning now to FIG. 1, the ring lock actuation system generally designated as 10 is connected to a nozzle body 12. The nozzle body consists of a main nozzle 13 that defines a main throat section 15 and a movable centerbody 16 that defines a secondary throat section 17. Supporting centerbody 16 is, for example, three circular support piston rods 18 positioned 120° apart that connect to pistons 22 at the downstream end and to the centerbody of the opposite end. The pistons are interfitted within cylinders 32 that terminate at nozzle body end plate 14.

A reinforcing rod 20 is centrally positioned through the support piston rod 18 and piston 22. The reinforcing rod is designed to carry the full load exerted against centerbody 16 and is fabricated from a nickel based super alloy such as Waspalloy, manufactured by Universal-Cyclops Specialty Steel Division, Cyclops Corporation, Pittsburgh, Pa. The material surrounding the rod is for example an inner layer 21 of silica phenolic processed by Fiberite Corporation, Winona, Minn., of low conductivity with excellent char strengths. The outer layer 23 is for example a carbon phenolic processed again by Fiberite Corporation and is used primarily because of its high resistance to erosion.

A piston rod or spike 26 is axially aligned with the bore of cylinder 32 and is connected to one end to the back side 25 of piston 24. Spike 26 terminates at its opposite end generally designated as 28. End 28 is conically shaped having walls 29 that converge to a point 30. End 28 is supported by, aligned with, and slidable within aperture 34 formed by end plate 18.

The centerbody is prevented from translating to a closed or blocking position by a ring lock plate generally designated as 36. A series of chamferred apertures defined by the ring lock plate corresponding to the number of centerbody support pistons (preferably three) and the walls 40 of apertures 38 are conically shaped to mate with wall 29 of end 28 of rod 26. Ring lock plate 36 is rotated around nozzle body 13 so that each aperture 38 is misaligned with pointed end 28 such that a portion of wall 29 contacts a portion of wall 40 of apertures 38, the compressive force resultant therefrom serving to prevent spiked rod 26 from penetrating all the way through aperture 38. The rotatable ring lock plate 36 is held in the misaligned position by restraining tab 42 affixed to surface 37 of ring lock plate 36. An elongated slot 44 is formed by ring lock plate 36 adjacent tab 42 to allow anchor tab 46 to extend therethrough. Anchor tab 46 is connected to end plate 14. An exploding ring lock restraining bolt 48 for example, is secured through holes formed by tabs 42–46 to maintain the ring lock pate in the misaligned position.

The ring lock plate is slidably retained adjacent end plate 14 by at least three shoulder type bolts 52 that extend through elongated apertures 54 formed by ring lock plate 36 and are threaded into end plate 14. The head 53 of shoulder bolt 52 is wider than the slot opening 54 and is sufficiently spaced from surface 37 to allow ring lock plate 36 to rotate around nozzle body 13 when the exploding restraining bolt 48 is actuated by wires 50 leading to a control mechanism (not shown).

Figure 2:
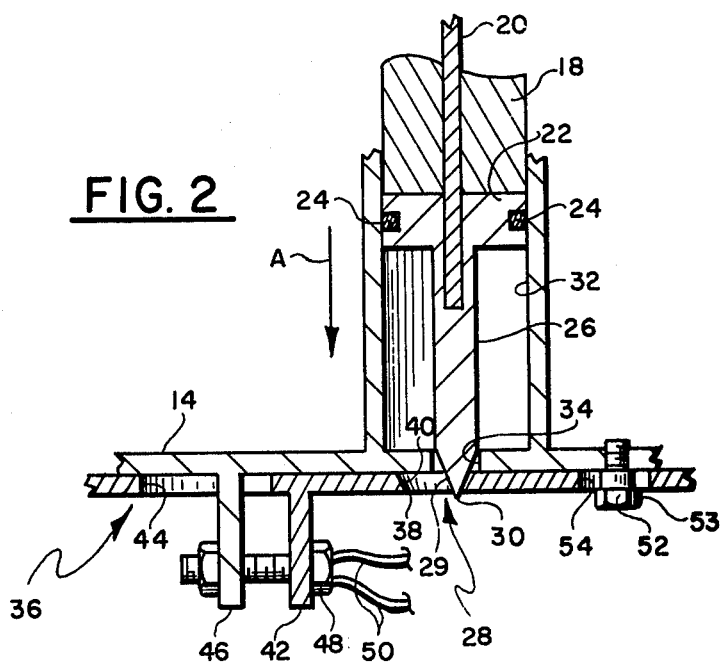
FIG. 2 is a view taken through line 2—2 of FIG. 1.

The relationship of spiked rod 26, conical surface 29 and mating surface 40 in ring lock plate 36 are more clearly illustrated with reference to FIG. 2. This view illustrates the ring lock plate in the misaligned position, whereby the compressive force of surface 29 contacting mating surface 40 of the ring lock plate prevent translation in direction "A" of piston 22. When exploding bolt 48 is actuated on command from the control mechanism by leads 50, the expulsion gas forces acting on centerbody 16 force rods 26 through chamferred aperture 38 simultaneously, thereby providing a single and effective means to drive the centerbody into a blocking position.

Figure 3:
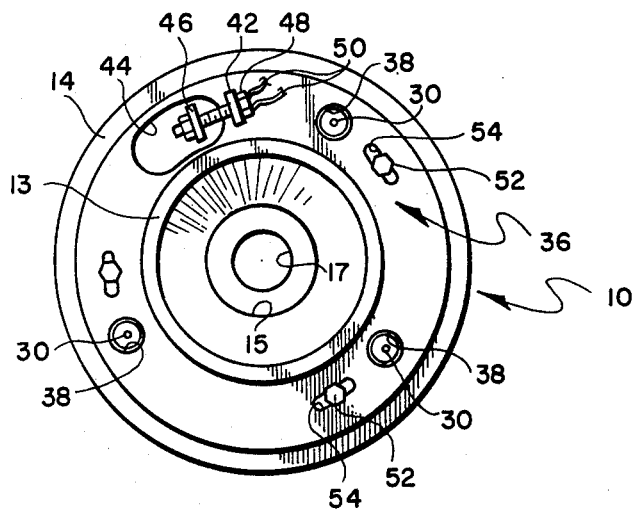
FIG. 3 is a view taken through line 3—3 of FIG. 1.

FIG. 3 clearly shows the relationship of the misaligned holes 38 with rods 26 and the actuating and restraining means associated with the ring lock plate 36. This view shows the ring lock plate moved in the "B" direction simultaneously allowing all of the pistons supporting centerbody 16 to move aft down cylinder 32. Heat resisting silicone rubber "O" rings 24 provide a seal to prevent hot gases from passing by pistons 22 (FIG. 1). The section of FIG. 5 reveals the relationship of the piston/rod in the closed position.

Figure 4:
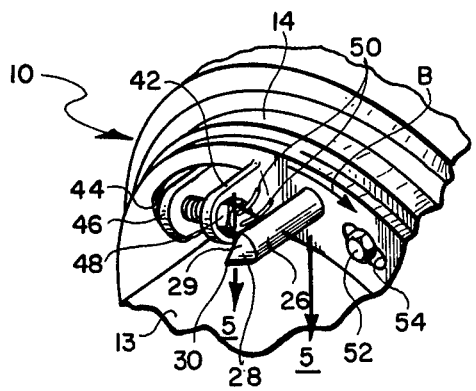
FIG. 4 is a partially cut-away perspective view illustrating the ring lock plate in a rotated position allowing the restraining pins to align themselves with their respective chamferred apertures.
Figure 5:
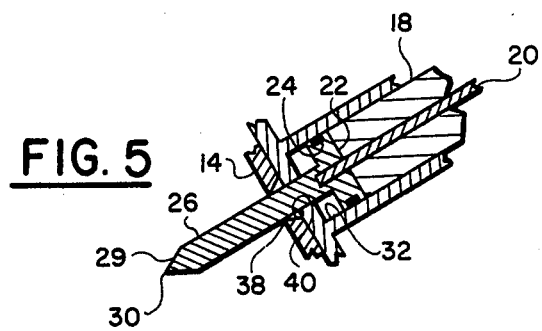
FIG. 5 is a view taken through line 5—5 of FIG. 4.

FIGS. 4 and 5 illustrate the ring lock plate in the actuated or aligned position.

Figure 6:
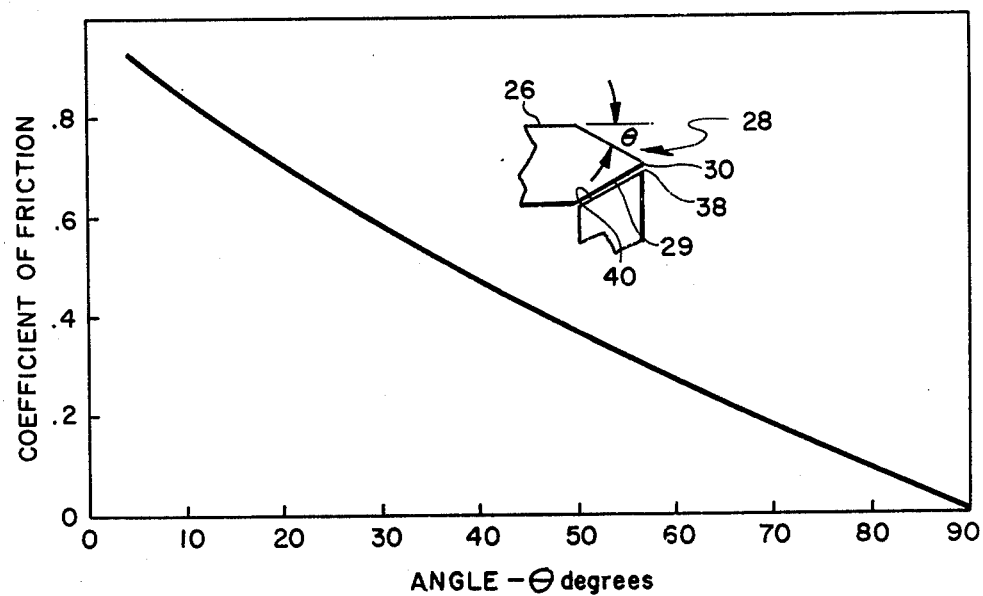
FIG. 6 is a chart illustrating the coefficient of friction relative to the angle of the wall of the conically shaped point of each of the pins.

FIG. 6 shows the maximum coefficient of friction verses point angle where the mechanism will always actuate. In the preferred embodiment, the angle $\theta$ is 30° where the following parameters are utilized: The solid propellant rocket nozzle outside diameter is, for example, 6½ inches in diameter, the main throat diameter is 2 inches (15 in nozzle body 13), the small secondary throat diameter in centerbody 16 (17) is 0.7 inch in diameter and the motor overall diameter is, for example, 8 inches. The piston (22) diameter in cylinder 32 is 1 inch in diameter.

Typically, in solid rocket engine operation gas temperatures range in the neighborhood of 5800°R.

Three forces primarily acting on the centerbody include (1) friction force (2) aerodynamic forces accelerating gas around the centerbody 16 and (3) pressure times the area of the pistons supporting the centerbody. The last mentioned force is the most influential force in actuating the centerbody. For example, if the combined piston area is small and the gas expulsion forces are large, then the actuating force driving the centerbody to a blocking position is large.

Referring agin to FIG. 1, when the centerbody 16 translates aft, soft seat 60 (typically fabricated from silica phenolic) positioned in the downstream side of the centerbody contacts hard seat 62 (typically fabricated from tungsten) imbedding itself in the soft seat, thereby effecting a seal preventing expulsion gases from passing thereby.

It will of course be realized that various modifications can be made in the design and operation of the present invention without departing from the spirit thereof.

Thus, while the principal, preferred construction, and mode of operation of the invention have been explained and what is now considered to represent its best embodiment has been illustrated and described, it should be understood that within the scope of the appended claims the invention may be practiced otherwise than as specifically illustrated and described.

I claim:

1. A mechanical ring lock actuation device for actuation of a secondary nozzle body commonly associated with a dual area solid rocket nozzle configuration into a blocking position during rocket engine operation comprising:
   - a main nozzle body, said body forming a main throat section thereby, said nozzle body terminating at a first end portion perpendicular to an axis of said nozzle body,
   - a movable centerbody spaced from, concentrically positioned within and axially aligned with said main nozzle body, said centerbody forming a secondary nozzle thereby,
   - at least one elongated support piston rod axially aligned with and connected at one end to the downstream side of said centerbody and at its opposite end, said piston rod is interfitted with at least one cylinder formed by said main nozzle body,
   - at last one piston rod spike connected to said opposite end of said support piston rod, said spiked rod being axially aligned and centrally positioned within said at least one cylinder, the downstream conically shaped spiked end of said piston rod spike extending through at least one orifice formed by said first end portion of said main nozzle body, said orifice being slightly larger in diameter than the diameter of said spiked piston rod, said spiked rod being slidable within said orifice,
   - a ring lock plate having a first side positioned adjacent said first end of said main nozzle body and rotatable thereon, said ring lock plate defining at least one chamferred orifice, the smaller opening of said chamferred orifice is defined by a second downstream side of said plate, said smaller opening being the same size as said orifice in said first end of said main nozzle body, the larger opening being defined by said first side of said ring lock plate facing said end of said main nozzle body, the angle of said chamferred orifice parallels the angle of said conically shaped end of said piston rod spike, said ring lock plate is rotated to align a portion of said orifice in said ring lock plate with said at least one orifice in said first end of said nozzle body to allow said conically shaped end of said piston rod spike to protrude into but not through said chamferred orifice, a portion of the conical surface of the spiked end contacting a portion of the parallel wall of said chamferred orifice in said ring lock plate,
   - means to retain said ring lock plate in said misaligned position to prevent rotation thereby mechanically preventing translation of said centerbody from movement to a blocking position, and
   - actuation means to release said retaining means to allow said ring lock plate to rotate aligning said at least one chamferred orifice in said plate with said orifice in said first end of said main nozzle body to allow said centerbody to translate to a blocking position.

2. The invention as set forth in claim 1 wherein there are three elongated support piston rods with said piston rod spikes connected thereto equidistantly spaced 120° apart supporting said centerbody, said rotatable ring lock plate defining three chamferred orifices, each of said chamferred orifices being misaligned with said conically shaped ends of said piston rod spikes to prevent translation of said centerbody to said blocking position.

3. The invention as set forth in claim 1 wherein said means to retain said ring lock plate in said misaligned position is a first axially aligned tab affixed to said first end of said main nozzle body, said tab extends through an elongated slot defined by said ring lock plate, a second axially aligned tab paralling said first tab is affixed to said ring lock plate, bolt means connected through holes defined by said first and second tabs to prevent said ring lock plate from rotation.

4. The invention as set forth in claim 3 wherein said bolt means connected between said first and second tabs is an exploding bolt, said actuation means to release said ring lock retaining means is an electrical charge supplied on command from a control mechanism to explode said exploding bolt thereby releasing said ring lock plate to allow said centerbody to translate to a blocking position.

5. The invention as set forth in claim 1 wherein the angle of said conically shaped end of said at least one piston rod spike is substantially 30° to said axis of said nozzle body, said parallel walls of said at least one chamferred orifice is substantially 30°.

6. The invention as set forth in claim 1 further comprising a reinforcing rod centrally positioned within said elongated support piston rod, said reinforcing rod extends between said centerbody and said piston rod spike, thus providing additional support for said centerbody.

* * * * *

UNITED STATES PATENT AND TRADEMARK OFFICE
CERTIFICATE OF CORRECTION

PATENT NO. : 4,102,498
DATED : July 25, 1978
INVENTOR(S) : Charles C. Cherry

It is certified that error appears in the above-identified patent and that said Letters Patent are hereby corrected as shown below:

> Column 1, prior to the first paragraph headed "Cross-Reference To Related Application", the following should be inserted" -- The invention herein described was made in the course of or under a contract or subcontract thereunder, (or grant), with the United States Department of the Navy. --.

Signed and Sealed this

Twentieth Day of March 1979

[SEAL]

Attest:

RUTH C. MASON
Attesting Officer

DONALD W. BANNER
Commissioner of Patents and Trademarks